United States Patent [19]

Jewer

[11] Patent Number: 4,534,031
[45] Date of Patent: Aug. 6, 1985

[54] CODED DATA ON A RECORD CARRIER AND METHOD FOR ENCODING SAME

[75] Inventor: Alan A. Jewer, Ft. Atkinson, Wis.

[73] Assignee: News Log International, Janesville, Wis.

[21] Appl. No.: 445,241

[22] Filed: Nov. 29, 1982

Related U.S. Application Data

[63] Continuation-in-part of Ser. No. 404,507, Aug. 2, 1982, , which is a continuation-in-part of Ser. No. 384,582, Jun. 2, 1982.

[51] Int. Cl.³ .................. G06F 11/10; G11B 27/00
[52] U.S. Cl. .................................. 371/38; 369/93; 371/2
[58] Field of Search ............ 371/38, 39, 40, 2; 360/49; 369/18, 30, 58, 93, 97, 284; 235/437, 464, 494

[56] References Cited

U.S. PATENT DOCUMENTS

| | | | |
|---|---|---|---|
| 3,186,707 | 6/1965 | Banning, Jr. et al. | 274/41.4 |
| 3,198,527 | 8/1965 | Stanton | 274/11 |
| 3,387,293 | 6/1968 | Stockebrand | 360/49 X |
| 3,543,007 | 11/1970 | Brinker et al. | 235/61.11 |
| 3,549,826 | 12/1970 | Browning | 179/100.3 |
| 3,657,699 | 4/1972 | Rocher et al. | 371/2 |
| 3,675,930 | 7/1972 | Summerfield | 272/11 R |
| 3,800,281 | 3/1974 | Devore et al. | 371/38 |
| 3,811,108 | 5/1974 | Howell | 371/40 X |
| 3,868,632 | 2/1975 | Hong et al. | 371/38 |
| 3,899,629 | 8/1975 | Westerberg | 340/173 LT |
| 3,961,315 | 6/1976 | Yokoyama | 340/173 LM |
| 4,102,569 | 7/1978 | Schwartz | 353/120 |
| 4,292,684 | 9/1981 | Kelly et al. | 371/38 |
| 4,375,100 | 2/1983 | Tsuji et al. | 371/38 |
| 4,410,877 | 10/1983 | Carasso et al. | 340/347 DD |
| 4,416,001 | 11/1983 | Ackerman et al. | 369/44 |
| 4,441,184 | 4/1984 | Sonoda et al. | 371/40 |

Primary Examiner—Charles E. Atkinson
Attorney, Agent, or Firm—Thomas R. Vigil

[57] ABSTRACT

The coded data (12) on the record carrier (10) and the method for encoding such data (12) in tracks (14) provide a relatively simple and yet very effective means for making the data record carrier (10), and particularly the data (12) recorded thereon, highly tolerant of errors such as "burst errors" where one or more spots of data on the data record carrier (10) are obliterated. The data (12) is recorded on the data record carrier (10) in arcuate nested tracks (14), each track (14) comprising a stream of data bits. The stream of data bits includes an encoded front track address (32) and encoded back track address (44) with coded groups or so-called Hamming type coded groups (52) of data bits therebetween each of which can comprise 96 or 105 data bits. Error correction is provided by including in the coded groups data words which include a data byte and a field of parity bits, typically an eight bit data byte followed by a four bit parity field. Also a cyclic redundancy checksum byte is provided in the group as a further check of the data therein. Further, this data is multiplexed. Additionally, one or two redundant groups are provided in each track (14) for recreating missing groups and a cyclic redundancy checksum field is provided for error detection in each track (14).

73 Claims, 8 Drawing Figures

FIG. 7

| $A_7$ | $A_6$ | $A_5$ | $A_4$ | $A_3$ | $A_2$ | $A_1$ | $\bar{A}_0$ | $\bar{A}_0$ | $\bar{A}_1$ | $\bar{A}_2$ | $\bar{A}_3$ | $\bar{A}_4$ | $\bar{A}_5$ | $\bar{A}_6$ | $\bar{A}_7$ |

FIG. 8

RECORDED WORDS ↓

| $D_{12}$ | $D_{11}$ | $D_{10}$ | $D_9$ | $D_8$ | $D_7$ | $D_6$ | $D_5$ | $D_4$ | $D_3$ | $D_2$ | $D_1$ | |
|---|---|---|---|---|---|---|---|---|---|---|---|---|
| | | | | | | | | | | | | $R_1$ |
| | | | | | | | | | | | | $R_2$ |
| | | | | | | | | | | | | $R_3$ |
| | | | | | | | | | | | | $R_4$ |
| | | | | | | | | | | | | $R_5$ |
| | | | | | | | | | | | | $R_6$ |
| | | | | | | | | | | | | $R_7$ |
| | | | | | | | | | | | | $R_8$ |

DATA BYTE 8 BITS | PARITY FIELD 4 BITS

CODED DATA ON A RECORD CARRIER AND METHOD FOR ENCODING SAME

CROSS REFERENCE TO RELATED APPLICATIONS

This application is a continuation-in-part of U.S. application Ser. No. 404.507 filed on Aug. 2, 1982 and entitled: METHOD FOR FORMATTING OPTICALLY ENCODED DIGITAL DATA ON A SUBSTRATE AND THE DATA RECORD CARRIER FORMED THEREBY which is a continuation-in-part of U.S. application Ser. No. 384,582 filed on June 2, 1982 and entitled: METHOD FOR OPTICALLY ENCODING DIGITAL DATA ON A SUBSTRATE AND THE DATA RECORD CARRIER FORMED THEREBY, and is related to U.S. application Ser. No. 625,573 filed on June 28, 1984 and entitled: A DIGITAL DATA RECORD.

TECHNICAL FIELD

The present invention relates to a method for encoding digital data in and along tracks on a substrate and the data record carrier with coded data formed thereby. More specifically, the present invention relates to the encoding of data on a data carrier such that serial data is distributed randomly throughout the data record carrier in data groups with parity fields, and redundant groups and cyclic redundancy checksum fields are provided for checking retrieved data so that errors can be detected and corrected, namely so that lost data can be recreated.

BACKGROUND ART

Heretofore it has been proposed in U.S. Pat. No. 4,213,040 to encode digital information in rows and columns on a record carrier. Data is read from the record carrier by movement of the record carrier on an X axis and rotation transport mechanism which is operable to make skew corrections.

Also heretofore various optical encoded data record carriers and optical "writers" and "readers" have been proposed. For example, in U.S. Pat. No. 3,549,897 there is disclosed an absolute electro-optical encoder for indicating the angular position of a shaft. The encoder includes a stationary disc and a rotary disc, the discs having concentric tracks with transmissive and non-transmissive portions which are binarily related. Light passing through the discs is picked up by certain selected combinations of photocells for indicating the position of one disc relative to the other disc.

In U.S. Pat. Nos. 3,501,586; 3,624,284; 3,885,014; 3,795,902; 3,806,643; 3,891,794; 4,090,031; and 4,163,600 issued to J. Russell, various "writers" and "readers" are disclosed for "writing" digital data on a spiral track and for "reading" digital data from the spiral track. In the optical encoding and decoding systems described in these patents opaque spots on the track correspond to logic 1 bits of binary data and transparent spots on the track correspond to logic 0 bits of binary data. Also, larger synchronization spots are provided at different places along the track.

An apparatus for scanning a data record medium is disclosed in U.S. Pat. No. 3,898,629 wherein binary digital information is recorded in the form of data along a circular arc and a plurality of such circle arcs of data information are arranged tightly adjacent each other.

In U.S. Pat. No. 3,919,697 there is disclosed a data record having track lines which may be separate parallel tracks or may be a single series track of the spiral or raster type.

In U.S. Pat. No. 3,983,317 there is disclosed an astigmatizer for a laser recording and reproducing system. In this system concentric circular tracks are formed in a thermoplastic record or disc by burning selected holes through the disc with a laser. The laser is "on" while the disc is being rotated a short distance to form an elongate data information bit in the track. Then, in reading the data the laser beam or spot is elongated in a direction transverse to the direction of the track with an astigmatizer unit so that a small elongate beam of light with an axis extending transverse to the axis of the track and of the elongate opening therein is used to read the opening.

In U.S. Pat. No. 4,094,010 there is disclosed an optical multi-channel digital disc storage system. Data is stored on a spiral information track and holes corresponding to the information data are burned into the material of the disc by an information radiation beam.

U.S. Pat. No. 4,094,013 discloses an optical storage disc system with disc track guide sectors wherein the data tracks are spiral shaped turns or concentric turns on the disc. The data stored is again in the form of holes burned into the disc.

U.S. Pat. No. 4,209,804 discloses a record carrier containing information in an optically readable radiation reflecting information structure. With the record carrier of this patent, data is stored in a spiral track on a disc in the form of information areas comprising pits pressed into the record carrier surface or hills projecting from the record carrier surface. According to the teachings of this patent, the depth of the pits or the height of the hills is constant and so is the width of the information areas and intermediate areas at the level of the plane of the lands. Then the information to be conveyed by the record carrier is contained in the variation of the structure of the areas in the tangential direction only. More specifically, the information areas are substantially V-shaped, the phase depth of each information area having one value between 100° and 120° and the angle of inclination between the walls of the information areas and normal to the record carrier are substantially constant and have a value between 65° and 85°.

As will be described in greater detail hereinafter the coded data on the record carrier and the method for encoding same of the present invention provide a relatively simple and yet very effective means for making the data record carrier, and particularly the data recorded thereon, highly tolerant of errors such as "burst errors" where one or more spots of data on the data record carrier are obliterated.

The data is recorded on the data record carrier in arcuate nested tracks, each track comprising a stream of data bits. The stream of data bits includes an encoded front track address and encoded back track address with coded groups or so-called Hamming encoded groups of data bits (hereinafter simply Hamming groups) therebetween each of which can comprise 96 or 105 data bits. Error correction is provided by including coded or Hamming group data words which include a data byte and a field of parity bits, typically an eight bit data byte followed by a four bit parity field. Also a cyclic redundancy checksum byte is provided in the group as a check of the data. Further the data in each group is multiplexed.

Moreover, one or two redundant groups are provided in each track for recreating one or two missing groups. Also, a cyclic redundancy checksum field is provided in each track for further error detection.

With this encoding, the data included in the eight bit data bytes can be checked with the parity field bits and if there is an incorrect check, then the incorrect or missing bits can be recreated. Likewise, the cyclic redundancy checksum checks the totality of the data bits in each group to see if the cyclic redundancy checksum agrees with the data retrieved. Then the larger cyclic redundancy checksum field in each track can be used to check all the data in the three to twenty one groups in each data track for accuracy of retrieval and the redundant group or groups can be used to recreate missing data.

The multiplexing serves to stretch out the data so that the bits forming one data byte are spread out over the stream of data bits in each track. As a result, if there is a "burst error", hopefully it will result in the deletion of only one or two bits from each data word in a group enabling the encoded error correction information in the parity field to be utilized in recreating the missing data bits.

DISCLOSURE OF THE INVENTION

According to the invention there is provided a method for encoding digital data which is recorded in arcuate tracks without timing or synchronization data on a planar substrate to form a data record carrier with a plurality of arcuate tracks thereon, each track being spaced from an adjacent track by a predetermined distance along a common centerline of the tracks, each track having the same radius throughout the arcuate path of said track such that each track extends in an arcuate manner across the data record carrier and is arranged in a nested manner relative to adjacent tracks along said common centerline, each track having a plurality of data cells therein and each track having a front track address section, a back track address section and groups of encoded data bits referred to as coded groups therebetween, each cell having the same cell length in the direction of each track for each bit of data stored in each cell and having the same cell width in a direction transverse to the direction of each track, each cell for one form of logic (0 or 1) being a non-transition cell and each cell for the other form of logic (1 or 0) being a transition cell, said method of encoding providing error correction and including the steps of: providing in each coded group a plurality of coded words, each word comprising a byte of data bits and a field of parity bits for error correction.

Further according to the invention there is provided a data record carrier made by the method described above.

Also according to the invention there is provided a method for encoding digital data which is recorded in arcuate tracks without timing or synchronization data on a planar substrate to form a data record carrier with a plurality of arcuate tracks thereon, each track being spaced from an adjacent track by a predetermined distance along a common centerline of the tracks, each track having the same radius throughout the arcuate path of said tracks such that each track extends in an arcuate manner across the data record carrier and is arranged in a nested manner relative to adjacent tracks along said common centerline, each track having a plurality of data cells therein and each track having a front track address section, a back track section and groups of encoded data bits referred to as coded groups therebetween, each cell having the same cell length in the direction of each track for each bit of data stored in each cell and having the same cell width in a direction transverse to the direction of each track, each cell for one form of logic (0 or 1) being a non-transition cell and each cell for the other form of logic (1 or 0) being a transition cell, said method of encoding providing error detection and/or correction of a track address in the front track address section and/or the back track address section and including the steps of: providing, in at least one of the front or back track address sections, bit positions twice the number of bit positions in the track address, placing the track address bits in the proper order in the first half of the bit positions in that track address section and placing an inversion or compliment of the address in reverse order in the remaining bit positions in that track address section.

Still further according to the invention there is provided a data record carrier having digital data encoded in a plurality of arcuate tracks without timing or synchronization data on a planar substrate, each track being spaced from an adjacent track by a predetermined distance along a common centerline of the tracks, each track having the same radius throughout the arcuate path of said track such that each track extends in an arcuate manner across the data record carrier and is arranged in a nested manner relative to the adjacent tracks along said common centerline, each track having a plurality of data cells therein, and each track having a front track address section, a back track address section and groups of encoded data bits referred to as coded groups therebetween, each cell having the same cell length in the direction of each track for each bit of data stored in each cell and having the same cell width in a direction transverse to the direction of each track, each cell for one form of logic (0 or 1) being a non-transition cell and each cell for the other form of logic (1 or 0) being a transition cell, and each coded group having error correction coded therein such that each coded group comprises a plurality of coded words and each word comprises a byte of data bits and a field of parity bits for error correction.

Still further according to the invention there is provided a data record carrier having digital data encoded in a plurality of arcuate tracks without timing or synchronization data on a planar substrate, each track being spaced from an adjacent track by a predetermined distance along a common centerline of the tracks, each track having the same radius throughout the arcuate path of said track such that each track extends in an arcuate manner across the data record carrier and is arranged in a nested manner relative to adjacent tracks along said common centerline, each track having a plurality of data cells therein and each track having a front track address section, a back track address section and groups of encoded data bits referred to as coded groups therebetween, each cell having the same cell length in the direction of each track for each bit of data stored in each cell and having the same cell width in a direction transverse to the direction of each track, each cell for one form of logic (0 or 1) being a non-transition cell and each cell for the other form of logic (1 or 0) being a transition cell, and a track address being encoded in said front or back address sections by having in at least one of the front or back track address sections, bit positions equal to twice the number of bit positions in the track address, with the track address bits placed in proper order in the first half of the bit positions in said front or back track address section and with an inversion or compliment of the track address bits placed in reverse order in the remaining bit positions in said front or back address section.

BRIEF DESCRIPTION OF DRAWINGS

FIG. 7 is a block layout of a coded front track address.

FIG. 8 is a chart of the array or matrix field of a coded or Hamming group after it has been retrieved from a track on the data record carrier and rearranged through demultiplexing to form the rows of data bytes and parity fields as shown.

BEST MODE FOR CARRYING OUT THE INVENTION

Figure 1:
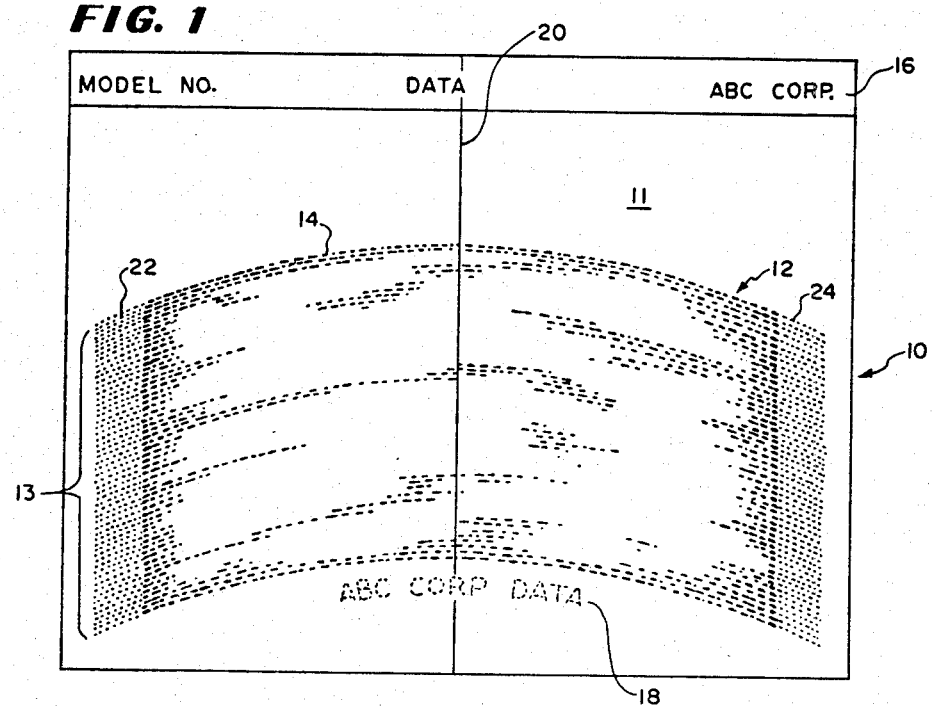
FIG. 1 is a plan view of a data record carrier constructed and arranged in accordance with the teachings of the present invention.

Referring now to the drawings in greater detail there is illustrated in FIG. 1 a data record carrier 10 constructed in accordance with the teachings of the present invention. The data record carrier 10 includes a substrate 11 which can be made from a number of different materials. For example, it can be made from paper, paperboard, coated enamel paper, plastic filament paper, Mylar TM, Kodalith Pan TM, Tri-X Pan TM, Plus-X Pan TM, dry silver, Tri-X TM, Plus-X TM, diazol, or vesicular materials.

In one preferred embodiment, the substrate 11 is made of a film negative or positive material and a mask or master of photosensitive material forming the data record carrier 10 is made photographically. The data 12 is represented by transparent or clear areas and dark or opaque areas. A preferred size of this mask is approximately 4 inches by 6 inches, which is the standard size for microfiche negatives.

Once a mask data record carrier 10 has been made, such mask can be reproduced or utilized for printing inexpensive data record carriers 10 on an inexpensive substrate 11 material such as paper or paperboard materials.

In the case of a data record carrier 10 which has a substrate 11 made from photosensitive material, data 12 is optically encoded therein in the form of a plurality 13 of tracks 14 utilizing photographic techniques.

In this respect, and as will be described in greater detail hereinafter, an optical data encoding apparatus hereinafter referred to as a "camera" is utilized to create cells 15 (FIGS. 2 and 3) in each track 14 where each cell 15 has a predetermined length L (FIG. 2) along the direction of the track and a predetermined width W (FIGS. 2 and 3) transverse to the direction of the track 14. Each cell 15 is transparent or opaque or portions thereof are transparent or opaque to define a certain logic state in the cell in accordance with the teachings of the present invention and as will be described in greater detail hereinafter.

When a mask data record carrier 10 is made, such a mask can be utilized for the printing of data record carriers 10 on a paper or paperboard substrate 11.

When the data 12 is printed, the cells 15 can be either white or black to form reflective or non-reflective cells 15 or half white and half black to form partially reflective and partially non-reflective cells 15 to represent different logic states, namely logic 0 or logic 1.

The substrate 11 can also have printed thereon other pertinent data in a header section 16.

In the embodiment shown in FIG. 1, the data record carrier 10 shown is utilized for storing information relating to a parts list, price list, and other pertinent data relative to a product sold under a particular model number by a particular company. Other data or a repeat of the data in the header section 16 can also be printed on the substrate 11 beneath the data 12 in the same manner the cells 15 of each track 14 are printed as shown at 18 in FIG. 1.

Figure 3:
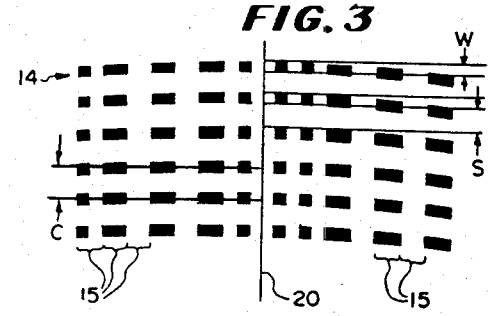
FIG. 3 is an enlarged view of the center portion of the data tracks shown in FIG. 1.

As will be described further in connection with the description of FIGS. 3, 4 and 5, when the data record carrier 10 is formed on a photosensitive substrate 11, each cell 15, having a given cell length L and a given cell width W that will represent one form of logic, logic 0 or logic 1, will be completely transparent or completely opaque. In other words, there will be no transition across the length of the cell and such cell is referred to as a non-transition cell and in this description will correspond to a logic 0 data bit.

Then, for adjacent cells, which will be characterized as containing a logic 1 data bit, part of the cell extending in a direction transverse to the direction of the track 14 will be opaque and the remaining part of the cell extending transverse to the direction of the track 14 will be transparent or vice versa. As a result, there is a transition intermediate and typically midway across the length L of the cell 15 from transparent or opaque or opaque to transparent. As a result, an optical reader having a light source which passes light directly, or via fiber optics, to the substrate 11 of the data record carrier 10 as the reader is moving arcuately along a track 14 will sense no transition along a cell 15 length L but will sense a transition (opaque to transparent or vice versa) when there is a transition intermediate the edges of a cell 15. Such optical information is converted to electrical signals by a photosensor moving with the reading head and sent to a microprocessor which has been programmed to sense when there has been a transition over a cell length and when there has not been a transition over the length of a cell 15 and then to generate a corresponding logic 0 or logic 1 data bit of information which is supplied to a random access memory.

It is important to note, however, that according to the teachings of the present invention, data is encoded in the form of a transition or a non-transition in each cell 15 so that there is no lost space between cells 15 and cells 15 can be made as small as present technology permits.

Referring again to FIG. 1, it will be apparent that each of the tracks 14 is arcuate and such tracks are created by moving a beam in an arcuate path. As taught in copending application Ser. No. 290,475, filed Aug. 6, 1981, and entitled: A DIGITAL DATA RECORD, each of the tracks 14 has the same radius and this radius is constant over the length of the track 14. Also, each track 14 of the plurality 13 of tracks 14 are spaced apart from one another a predetermined distance S (FIG. 3) with each track 14 extending in an arcuate manner across the substrate 11 of the data record carrier 10 so as to be arranged in a nested manner, again with each track 14 having the same radius.

In this way, the data record carrier 10 can be positioned on a carrier or transporter of a reader and once proper alignment has been obtained, the data record carrier 10 can be indexed along an axis 20 which is colinear with a line that extends across the data record carrier 10 and is colinear with a radius of each data track 14.

In reading data from the data record carrier 10, a rotating reader or scanner head will rotate over the first track 14 on a rotation thereof picking up and reading the data encoded on the track 14 and then while the reading head or scanner is completing a revolution around its rotating axis, the data record carrier 10 is indexed along the line or axis 20 a distance S from the first track 14 to the second track 14 and so on for each successive track 14.

When the data record carrier 10 substrate 11 is made of a non-energy tranmissive material, such as a paper per or paperboard material, and the data 12 is optically encoded in the cells 15 by forming a non-transition logic 0 cell 15 with a fully reflective or fully non-reflective surface and a transition logic 1 cell 15 with a portion being reflective and another portion being non-reflective, then the reader will be of the type which directs light onto the surface of the data record carrier 10 and which has a sensor adjacent the point of light emission for sensing reflected light from reflective areas.

From empirical tests and experiments with different substrate materials, different sizes of substrates, different cell widths, different cell lengths, and different radii for the tracks, a number of parameters have been determined. For example, it has been determined that a very useable data record carrier 10 is provided when the track 14 radius is between 4 and 18 inches and that a preferred radius for each track 14 is somewhere between 8 and 12 inches.

Also it has been determined empirically that for a track 14 radius of between 4 and 18 inches the arc subtended by the track can be between 120° and 30°.

More specifically, for tracks 14 having a radius of somewhere between 8 and 12 inches, a preferred arc subtended by the track 14 is 60° wherein at least 45° of the arc of the track 14 contains information data.

Figure 2:
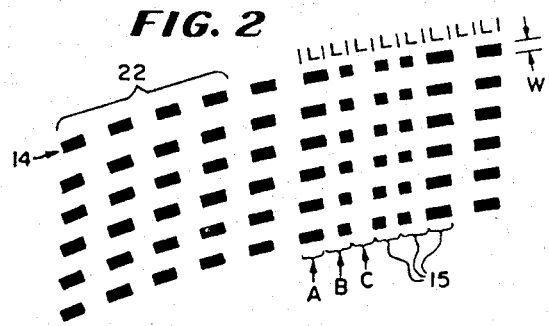
FIG. 2 is an enlarged view of the upper left hand corner of the data tracks formed on and in the substrate of the data record carrier shown in FIG. 1.

Referring now to FIG. 2 there is illustrated therein the beginning of the first six tracks 14 shown at the upper left hand corner of the plurality 13 of tracks 14 on the substrate 11 of the data record carrier 10 in FIG. 1.

Typically, at the beginning and at the end of each track 14, a leader 22 and a tailer 24 are provided, each composed of a series of non-transition logic 0 cells 15 where no transition occurs across the length L of each cell 15. Thus, the length L of the cell 15 would be fully non-reflective (or opaque) or fully reflective (or transparent) and would alternate that way until an address portion of the track 14 is reached.

As shown in FIG. 2, the beginning of the track address is shown with four logic 0 cells, the first one being a full transparent (or transmissive) cell 15, the next one being a fully non-reflective (or opaque) cell 15, etc. through four cells 15 to cell A. Then there is shown a transition cell B which has the first portion thereof reflective (transmissive) and a second portion thereof non-reflective (opaque). The next cell C is a logic 0 cell and is fully reflective (or transmissive). The succeeding cells 15 are a transition cell the first portion of which is non-reflective (opaque) and the second portion of which is reflective (transmissive) followed by another transition cell 15 and then two non-transition cells 15.

It has been determined empirically that a useful cell length L for optically encoded data is between 0.002 inch and 0.020 inch. A cell length L which is preferred with respect to high compacting of data and which provides a sufficient cell length to facilitate encoding and reading of the data 12 is approximately 0.006 inch. The width W of each cell 15, which is not drawn to scale in FIGS. 2 and 3, can be between 0.0007 inch and 0.010 inch. A very suitable cell width dimension W in the direction extending transverse to the direction of the track has been found to be from 0.002 inch to 0.008 inch.

It has also been found empirically that a very suitable spacing S for the nested arcuate tracks 14 is a dimension which is 10 to 30 percent of the width W.

Thus, the spacing S taken along the center line or axis 20 on which the tracks 14 are arranged or nested as shown in FIG. 1 can be as small as 0.0002 inch.

As further empirical tests are made and advances are made in microtechnology techniques, further compression may be available. Presently a center-to-center track spacing of between 0.002 inch and 0.011 inch with a track width or thickness between 0.0007 and 0.010 inch have been found empirically to be practical and workable dimensions.

It will be appreciated that the spacing between the tracks 14 at the beginning of the tracks 14 and at the ends of the tracks 14 will be less than the spacing S in the middle along line 20. In fact, if one were to extend the tracks another 60°, a total of 90° from either side of the line 20, they would converge toward each other and eventually intersect. Thus, although the arcuate tracks 14 appear to be parallel spaced, they are, in reality, equal radii tracks that are arranged in a nested array with a space in one embodiment of between 0.007 and 0.010 inch from each other at the place (along the line 20) of maximum spacing.

Figure 4:
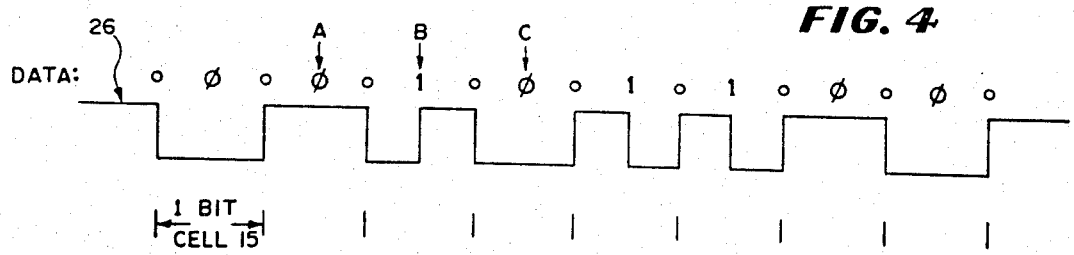
FIG. 4 is a graph of the electrical signal generated by the light energy transmitted or reflected or not transmitted or not reflected across each cell of part of a track shown in FIG. 2 with the corresponding logic state stored in the cell indicated thereabove.

In FIG. 4 is shown a waveform 26 of the electrical signal generated from an optical reading of the data in the first track 14 shown in FIG. 2. Here it is apparent that a fully transmissive or reflective cell 15 and a fully non-transmissive or non-reflective cell 15 corresponds to a data bit of logic 0 in that cell 15. Thus, starting with a first cell 15 which is identified as cell A, there is a fully non-transmissive (opaque) or fully non-reflective surface thereon on a substrate 11 such that there is no transition across the length L of the cell as a reader passes along that track 14 over that cell A and the logic of that data bit is logic 0.

Then the next cell B is partially transmissive or reflective and partially non-transmissive or non-reflective so as to cause a square waveform in signal 26 for cell B. This corresponds to a logic 1 data bit as shown. The next cell C is a non-transition cell C which is fully transmissive or fully reflective. The succeeding cells 15 shown in FIG. 4 are transition, transition, non-transition, non-transition and non-transition.

It is to be appreciated that by establishing logic in the form of a transition or non-transition over a given cell length L, such as a cell length of 0.006 inch, the optically encoded data 12 in the track 14 on or in the substrate 11 of the data record carrier 10 can have a wide degree of tolerance with respect to the sharpness or fuzziness of cell edges or the point of transition in the cell 15. In other words, the data 12 can be tolerant of a lot of noise. In this respect, it is not essential that a transition take place within a very confined area of the cell length L. As a result, the position of the cell edge or the position of a transition in a cell or the sharpness of either can vary up to at least 25% of the desired intended location of the cell edge or transition with the data still being highly readable. In this respect, the beginning of the non-reflective area of cell A could be 25% to the left or right of the beginning edge of cell A and the optical sensing and resulting electrical signal generated by the optical sensing would still be able to indicate to a microprocessor that there was no transition over the major length of the cell and that therefore the data bit stored in cell A is logic 0.

Likewise, if the transition in a transition cell such as the cell B occurs somewhere to the right or left of the middle of the cell B, up to at least 25% on either side of the middle of cell B, there will still be a transition over the length L (timewise and distancewise) of cell B to indicate to a microprocessor that a logic 1 data bit is stored in cell B.

As a result, by utilizing the optical transition or non-transition across a cell length L for encoding logic values in the cells 15, i.e., a logic 0 or logic 1, a very efficient and effective data record carrier 10 is provided.

Further in this regard, cell spacing is not required since the microprocessor is only concerned with the transition. Thus a series of logic 0 cells 15 are defined by alternating fully reflective (transmissive) and fully non-reflective (non-transmissive) cells 15 and transition cells 15 for the other form of logic, namely logic 1, are identified by any cell where there is a transition between a reflective (transmissive) area and a non-reflective (non-transmissive) area within a cell 15 across the length L of the cell 15.

Additionally, and as noted above, since transitions are being sensed within a cell 15, the cell edge for a non-transition cell 15 or the position of transition within a cell 15 for a transition cell 15 need not be precise and fuzziness and inaccuracy in the position of such transition can be tolerated at least up to 25% of the intended location of the cell edge or position of transition within the cell 15. This makes the optically encoded data very tolerant to noise and very tolerant of errors in printing, or even inaccuracies in the location of printing of a cell edge or transition in a cell 15. The data record carrier 10 is also tolerant of substrate dimensional changes, such as, but not limited to, thermal, chemical, or mechanical changes. It is also tolerant of localized or universal changes to the substrate, such as, for example, changes due to moisture.

It will be appreciated from the above that in creating a data record carrier 10 one will first select a track path on the substrate 11 which is defined by the radius of the track 14 and the arc to be subtended by the track 14.

Next a cell length L in the direction of the track 14 is selected for each bit of data to be stored in each cell 15 on each track 14. Then a cell width or track width dimension W transverse to the direction of the track 14 is selected.

Then, one selects a non-transition cell 15 for one form of logic, such as logic 0, to be stored in each non-transition cell 15 and a transition cell 15 for the other form of logic, e.g., logic 1, to be stored in each other transition cell for the other form of logic, e.g., logic 1.

Next, depending upon the data to be encoded, a computer associated with a camera for making a data record carrier 10 on film or photosensitive material is programmed to direct or not direct a light beam, such as a laser light beam, onto the film emulsion while the laser light beam is rotating through the specified arc to be subtended by the track 14.

After a first track 14 is formed or encoded, the camera is indexed a track spacing S and the above procedure is repeated.

In practicing the method for printing a data record carrier 10 of alternatiing reflective and non-reflective areas for cells 15 on a substrate 11, a mask or photosensitive material is utilized to print alternating dark or non-reflective areas and light or reflective areas on the paper substrate 11.

Also it is to be noted that it is immaterial whether the printing is identical to the mask or the reverse of the mask since it is the occurrence of a transition over a cell length L which is important and not whether the cell 15 is light (white) or dark, i.e., reflective or non-reflective.

In accordance with the teachings of the present invention and as will now be described in connection with the description of FIGS. 5 and 6, the tracks 14 are formatted and encoded with data bits in the cells 15 on the substrate 11 of the data record carrier 10 in such a manner as to provide encoding of data, compression of data, error detection and error correction as well as to facilitate location of and recognition of tracks 14.

Figure 5:
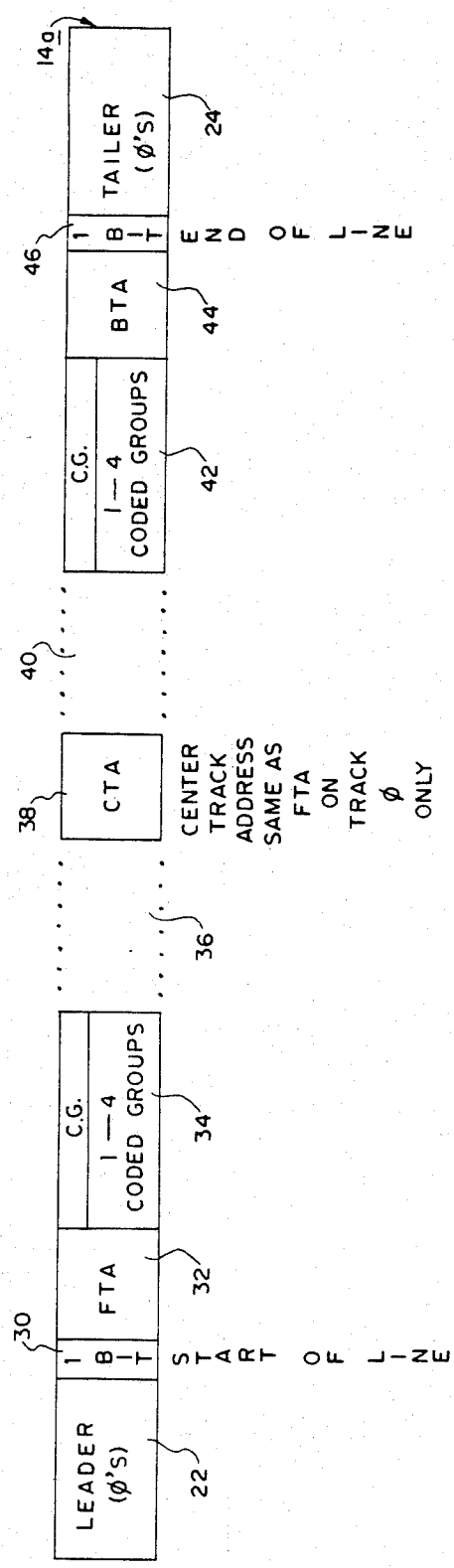
FIG. 5 is a block layout of the first or zero track.

To achieve these objectives the leading end and tail end of each track are mirror images of each other so that the first or zero track designated as track 14a in FIG. 5 can be readily identified, reading forward or backward. This first or zero track 14a is utilized by a reading or scanning device to align the data record carrier 10 and to obtain information about the data on the data record carrier 10, which information is read only by the computer or machine for transcribing data from the data record carrier 10.

Figure 6:
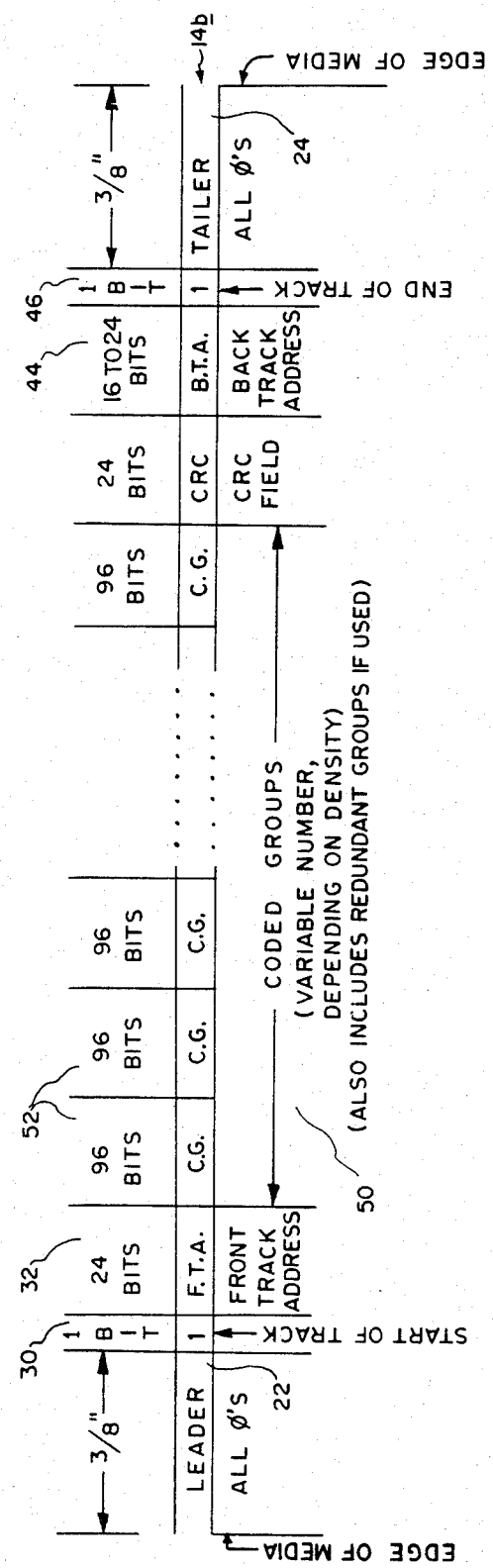
FIG. 6 is a block layout of the second through nth tracks on the data record carrier.

Information on this first or zero track 14a and on the second through nth tracks 14b shown in FIG. 6 is formatted and encoded thereon in a manner which prevents someone from reading the data from other than a properly programmed scanner or reading device.

Moreover, the data is placed in coded groups on the tracks 14a and 14b to enable recreation of missing data if there is an error, such as data missing from a track, i.e., a "burst error" such as is caused by a cigarette burn or the punching of a hole through the data record carrier 10.

Referring now to FIG. 5, the first or zero track 14a has the leader section 22 comprised of all zero data bits, namely of non-transition data cells 15. Likewise, the tailer 24 is comprised of a series of zero data bits or non-transition cells 15. This is apparent from FIG. 2 which shows the non-transition cells of leader section 22.

After the leader section 22 of non-transition cells there is a "start-of-line" section 30 which is a transition cell or a logic 1 bit of data. This one bit transition cell 30 separates the leader section 22 from a front track address (FTA) section 32. Such front track address section 32 can have up to 60 bits of address information.

Next there is formed on the track 14a a plurality of coded groups 34 which may be from 1 to 4 groups 34 and preferably 3 to 4 coded groups 34. These coded groups 34 are preferably so-called Hamming groups and have information encoded therein in the manner taught by Richard W. Hamming. For further details of how the data can be coded to achieve error correction, reference is made to *CODING AND INFORMATION THEORY* by Richard W. Hamming, published by Prentice-Hall, 1980. Typically each coded group will have up to eight twelve bit words of data.

Following the coded groups 34 on the first track 14a is a dead space 36 of all non-transition cells as shown in FIG. 2. Next is a center track address (CTA) section 38 which is the same as the front track address section 32. Only the first or zero track 14a has a center track address section 38.

After the center track address section 38 on the first track 14a is a second dead space 40 of zero or non-transition cells followed by another plurality of coded groups 42 of data 12 which can be 1 to 4 in number and preferably 3 to 4 in number. Next is a back track address (BTA) section 44 which is separated from the tailer 24 by an "end-of-line" logic 1 data bit or transition cell 46. The back track address section 44 can have up to 60 bits of address data and is preferably formed on the track 14a in reverse manner to the front track address section 32 such that the tailer 24, transition cell 46 and back track address section 44 are a mirror image of the leader 24, the transition cell 30 and the front track address section 32.

The number of coded groups 34 and of the coded groups 42 will depend upon the size of the data cells 15 utilized and the amount of data that is to be stored on the first or zero track 14a. In this respect, if the cells 15 are large, i.e., a low density data storage on each track, then only 1 or 2 coded groups 34, 42 will be provided on the first or zero track 14a. Alternatively, if it is a high density track with small cells 15, then up to four coded groups 34, 42 will be provided at the beginning and end of the track 14a.

This first track 14a will be readable only by the computer associated with a reader or scanning device and will contain information regarding (a) the machine code used, (b) the program load address, (c) the program size, (d) the number of tracks 14 on the substrate 11, (e) the spacing between tracks 14, (f) the type of data stored on the tracks 14, (g) the coded groups per track 14b, (h) the compression and error coding flags and (i) other special information for the computer only.

It will be appreciated that by having the tail end of the track 14a formed as a mirror image of the leading end of the track 14a, a reader or scanning device can read the track 14a frontward or backward to find out which track it is.

Referring now to FIG. 6, it will be readily apparent that the leading end and tailing end of each of the second through nth tracks 14b are substantially identical to the leading end and tail end of the first track 14a. In this respect, each track 14b includes a leader 22 composed of non-transition cells 15, a transition cell 30, a front track address section 32, a back track address section 44, a transition cell 46 and a tailer section 24 comprised of non-transition cells 15.

Again, the tailer and back track address sections 24 and 44 are mirror images of the leader and front track address section 22 and 32. Also as shown in FIG. 6, the leader and tailer sections are preferably ⅜ inch long and extend to the side edges of the substrate 11.

In the middle of each track 14b between the front track address section and the back track address section 34, there is formed a plurality 50 of coded groups 52 containing the digital data recorded and stored on the substrate 11 of the data record carrier 10. As shown, the coded groups 52 will vary in number depending upon the density of the cells 15, i.e., on the size of the cells 15. Also, as shown, each group 52 of the plurality 50 of coded groups 52 includes 96 bits of data and is coded so that only a properly programmed scanner or reading device can read the data 12. Again, the coded groups 52 are preferably Hamming encoded groups comprising data bits that are coded or formatted according to techniques taught by Richard Hamming in his book *CODING AND INFORMATION THEORY* referred to above.

Preferably, a cyclic redundancy checksum (CRC) field section 60 is formed on each track 14b at the end of the plurality 50 of coded groups 52 and before the back track address section 44. This cyclic redundancy checksum field section 60 is typically a 16-bit word derived from the original user data on the track 14 using the industry standard CCITT polynomial, i.e., a residue add and shift technique, to generate a CRC field section for each track's input of data. The function of this CRC section 60 is to perform error detection only and the value of the CRC section is recorded at the end of each track 14b and is used to determine if the data on the track 14b was retrieved properly. Typically to the CRC byte there is added 8 parity or Hamming bits so as to form two 12-bit words as indicated in FIG. 6. Further, as an alternative, such CRC field can be included in the front track address section 32 and/or the back track address section 44.

It will be appreciated from FIG. 6 that each of the coded groups 52 includes 96 bits or eight twelve bit words. Accordingly, the user data is stored as eight bit bytes in each word in the plurality 50 of groups 52. Additional information is added during the recording process for error correction, error detection and housekeeping. This additional information is used by the reader or scanning device to allow error-free reading of imperfect data and is deleted from the user data prior to the data being delivered to the host. That is to say, the original data is reconstructed and put out unaltered.

Again, as stated above, the twelve bit words are coded so that a "best guess" can be made of the proper data byte if there is a "burst error", i.e., data missing, such as occasioned by the punching of a hole in the data record carrier 10 when putting it on a spindle, or by a cigarette burn on the substrate 11, as will be described in greater detail hereinafter.

Also it is important to note that the tracks can be read forward or backward and there is no need for any synchronization flags since a reader or scanning device will know exactly which track it is reading when reading forward or backward. Also, the single transition cells (logic 1 bits) 30 and 46 indicate the start or end of a track 14 and the start or end of the data area on the tracks 14a and 14b.

Since the leaders and tailers are all zeros, it is important to provide coding for identifying the first or zero (∅) track. Also in case part of an address is missing, it is important to be able to determine the address anyway. One way, of course, is to read the track backward to obtain the correct address. Another way is by coding of the address as shown in FIG. 7.

In FIG. 7 is shown a diagram of the address bits for a 16-bit address. Here the address word includes an 8-bit address byte of bits $A_0$ through $A_7$. The address byte is first encoded in proper manner from $A_7$ to $A_0$ in the first eight bit positions in the address section. Then a second byte comprising a compliment or inversion of the address byte is arranged in the remaining address bit portions of the address section in reverse order $\overline{A_0}$ through $\overline{A_7}$. For example, for track 0, the address byte is 00000000 and the address word is 0000000011111111. Then the address word for track 1 is 0000000101111111 and so on.

Another address encoding technique is to combine the address with the CRC field, i.e., the cyclic redundancy checksum field. The CRC is the result of an application of an exclusive OR and shift algorithm which uses or invokes the CCITT polynomial.

Typically the address includes a one byte track address and the CRC field includes two bytes forming a cyclic redundancy checksum for all the data bits resulting in three bytes. Now a cyclic redundancy checksum byte for these three bytes is developed by invoking the CCITT polynomial to provide four bytes of data. Then and as will be more apparent from the description of FIG. 8 set forth below, a parity field or field of parity bits is provided for each of the four bytes and the four resulting words are multiplexed and then recorded in a track as a stream of data bits in the respective address section. Such address and CRC combined encoding of data can be encoded in both the front track address section 32 and the back track address section 44 with the CRC field section shown in FIG. 6 being eliminated by reason of its incorporation into the back track address section 44.

As noted above, the errors encountered with data on film media or other record carriers 10 are errors that often occur in pairs, if not in larger groups. This form of error is often referred to as "burst error" which can be occasioned by a smudge, burn or puncture of the film media or record carrier 10. As a result the media or carrier 10 will have large error free areas with one or more spots which have many errors of no data grouped together.

To detect and correct for these types of errors, the present invention teaches the use of several, preferably five, encoding techniques which consist of (a) multiplexing the data bits in each coded group, (b) providing a so-called Hamming encoded code which is a four bit parity field consisting of parity bits added to each data byte in the coded or Hamming type group, (c) providing a cyclic redundancy checksum byte in the coded or Hamming type group at the end of the field for the group obtained by invoking a residue add and shift technique to the data bytes, (d) providing at least one redundant group which is a mathematical derivative of the original data on a track 14 such as obtained by exclusive ORing of the data bits in all the coded groups, and (e) providing a cyclic redundancy checksum field section which is obtained by applying a residue add and shift technique using the CCITT polynomial to all the coded groups.

As will be described in greater detail hereinafter, the multiplexing and the parity bit fields enable a microprocessor to correct 1 and sometimes 2 bit errors per data word in each group and the redundant group or groups plus a CRC error detection field enable a microprocessor retrieving the data to determine errors and then reconstruct one or two groups that may have been lost due to a "burst error".

The multiplexing is accomplished by recording the eight bit data bytes plus four bit parity fields, i.e., the twelve bit resulting word with all the eight first, or twelfth, bits in each row, i.e., the columns shown in FIG. 8, recorded first in the recorded bit stream followed by all the eleventh bits, etc. This may be more apparent from the chart of FIG. 8 where the data bits are shown demultiplexed and arranged in a field and where the recording of the words or bit stream is indicated, as shown, as extending in the direction of the columns.

In this respect, the sequence of the bits as recorded on the track 14 is from top to bottom of the columns $D_{12}$–$D_1$, top to bottom, etc. from the array in the chart shown in FIG. 8. Here the first eight bits of recorded data are the bits in column $D_{12}$ starting from top to bottom. Then the next series of recorded bits are the bits in column $D_{11}$ from top to bottom and so on. However, the actual information data of eight bit bytes are the bits extending in each row $R_1$ to $R_8$ from $D_{12}$ to $D_5$. The data is received by the microprocessor in the order of the columns and then demultiplexed or transposed and arranged in the array of rows as shown in the chart of FIG. 8. Thus, destruction or loss of all the recorded data in a series sequence of bits in column $D_{12}$, for example, will result in each eight bit byte in rows $R_1$–$R_8$ having one erroneous or missing bit, i.e., the first bit, bit $D_{12}$, $R_1$; $D_{12}$, $R_2$; . . . .

The 96 bit string of data bits formed by columns $D_{12}$–$D_1$ arranged end to end in a string, multiplexing of rows $R_1$–$R_8$, form a coded group, i.e, a Hamming type group.

The multiplexing expands the error correction capability of the coded group since use of a Hamming type code only can enable correction of a small number of errors within a given data byte, i.e., 1 or 2 bits. The resulting multiplexed 96 data bits form eight Hamming type words or coded words.

Each track 14 will contain a variable number of coded groups depending on the density of the cells 15 on or in each track 14. Also the process of multiplexing eight bytes is referred to as multiplexing to degree eight.

The data field (the chart of FIG. 8) within each coded group contains eight bytes, seven of which are data bytes and one of which, usually row $R_8$, is a cyclic redundancy checksum byte. This CRC byte is formed by using or applying a residue add and shift technique or an exclusive OR and shift algorithm using the CCITT polynomial. The result is a 16-bit word or field and the eight most significant bits are discarded and the remaining eight bits form the cyclic redundancy checksum byte. This cyclic redundancy checksum byte can then be used to determine whether or not the whole coded group was successfully retrieved from the recorded data bits retrieved from a track 14.

Another technique is to take the most significant eight bits and exclusively OR them with the least significant bits and use the resulting eight bits for the cyclic redundancy checksum byte.

Also, of course, different and/or additional error detection and/or error correction methods can be used in encoding the data on the tracks 14.

The Hamming code, taught by Richard W. Hamming in his book *CODING AND INFORMATION THEORY*, published in 1980 by Prentice-Hall, is an error-correction code used to correct all single bit and some double bit errors, i.e., up to 16 bits, occurring in the 96 bit data stream in each coded or Hamming type group.

The Hamming code technique works by storing redundant information along with the original data. In this respect, and as described above and shown in FIG. 8, a four bit parity code field consisting of parity bits over various parts of each eight bit byte are added to the data byte to form a coded (or Hamming) twelve bit word. Each parity bit records whether the sum or compare of the bits in a corresponding part of the data byte is odd or even.

For example, one way of using parity bits for a four bit word of 1 0 0 1 is to use the sum of each two adjacent bits as a parity bit. In this example the sum of 1 and 0 is 1, the sum of 0 and 0 is 0 and the sum of 0 and 1 is 1 such that a three bit parity field of 101 is obtained and added to the four bit data byte to provide a seven bit word of 1 0 0 1 1 0 1. Similarly, for a four bit byte of 1 0 1 0 the seven bit word will be 1 0 1 0 1 1 0. Note a sum or compare of 00 or 11 is 0 and a sum or compare of 01 or 10 is 1.

In this example, the sums of each two (or more) adjacent bit subgroups are checked against the corresponding parity bit in the parity field.

Hamming-parity bit correction techniques may be better understood by reference to an array of dots, using for example the matrix shown in FIG. 7. First, imagine that there is a data point in the center of each box $D_{12}$, $R_1 \ldots D_5$, $R_7$. Then assume that data can be retrieved on a scale where the bit could be found to fall within a box but not on the center of the data point. However, a data bit within a box is closer to the data point in the middle of the box than to any other data point. Mr. Hamming's techniques then provide a way for determining in which box the data bit falls and then the data point in the middle of that box is assumed to be the correct data bit.

As a result of use of Hamming encoding techniques, when the parity check of the data byte does not compare with the parity field, a "best guess" can be made by a microprocessor to determine the proper data byte. A proper or correct guess always is made for a single bit error and approximately half the time for a double bit error by the microprocessor. Such a Hamming code or parity field is referred to as a (12, 8) code.

The cyclic redundancy checksum byte usually occupies row $R_8$ and is derived by implementing the CCITT polynomial via a residue add (exclusive OR) and shift algorithm with respect to each of the seven words in rows $R_1$–$R_7$ resulting in a byte from which an eight bit cyclic redundancy checksum byte is obtained. This CRC byte is essentially a mathematical combination of the seven data bytes. Further a parity bit field is derived for this CRC byte and added thereto to form a Hamming encoded cyclic redundancy checksum word.

Typically, a 16-bit byte is obtained and represents all the data in the coded Hamming type group. In one embodiment, only the eight least significant bits are used and the remaining eight most significant bits are discarded.

In another embodiment, the eight most significant bits are exclusively ORed with the eight least significant bits and the resultant eight bit byte is used as the cyclic redundancy checksum byte.

With respect to the cyclic redundancy checksum for each track 14, i.e., the CRC field section 60, the same algorithm with the CCITT polynomial is applied to all data in all groups. In other words, the CRC technique is invoked for all the bytes in all the groups and the result is a 16-bit resultant byte which forms the CRC field section 42.

For example, the addition of the 56 bits of data (the seven data bytes) in each coded group is exclusively ORed and shifted and the residue exclusively ORed and shifted with the next group of 56 data bits and so on eventually resulting in a 16-bit CRC byte to which can be added eight parity bits to form a coded CRC field.

In using the cyclic redundancy checksum with respect to all of the recorded coded groups retrieved with one group missing, the microprocessor exclusively ORs each group and shift to obtain a 16-bit byte which is compared to the CRC field retrieved and if they do not compare, the microprocessor knows a group has been lost.

Then, in order to be able to recreate the missing group, one or two redundant groups are provided in each track 14 according to the teachings of the present invention.

A redundant group is obtained by doing a bit by bit compare of the 56 bit field in the first coded group 52 with the 56 bit field in second coded group 52. This exercise or procedure is referred to as a compare, a residue add or an exclusive ORing. Essentially the bits are added together without any carry with a 1+1 or 0+0=0 and with a 1+0 or a 0+1=1.

Then this result is compared with the 56 bit field in the next coded group. At the end of this procedure the resultant group is a comparison of all fields and this group is called a redundant group. As with the other groups this field can be coded with a Hamming type code or parity field and a checksum word of the eight least significant bits or an exclusive ORing of the least and most significant bits to obtain an eight bit CRC byte and the total group or field of 96 bits can be multiplexed.

This redundant group is placed at the end of, or as the last one of, the coded groups 52.

In using such redundant group a residue add and shift technique is applied to the retrieved data and the resultant checksum byte of 16 bits or some part thereof is compared with the checksum byte in the CRC field section. If they do not compare, the CRC field section will reveal which group is materially altered or missing. Then that group is discarded and a compare, residue add or exclusive ORing is performed sequentially on all the data fields in the "good" retrieved groups and the redundant group. The result will be the missing group.

Since a "burst error" may include two adjacent groups, preferably two redundant groups are developed, one for the even numbered coded groups and one for the odd numbered coded groups. Then the first of the coded groups will be the redundant group for all odd or even numbered groups and the last group will be the redundant group for all the even or odd numbered groups. Thus, for 21 groups, group 1 and group 21 are redundant groups, each encoded with parity field and cyclic redundancy checksum bytes and multiplexed, and groups 2–20 are coded groups with information data.

As a modification to the 96 bit coded or Hamming type encoded groups, each such group can have 105 bits (instead of 96 bits) with 64 data bits, 28 parity bits and a 13 bit cyclic redundancy checksum byte. This would result in eight 8-bit bytes. The data will be arranged in an array of 15 columns and 7 rows. The data bits will be multiplexed such that the stream of data bits on a track 14 in a group 52 will be a serial stream of the 15 columns top to bottom, top to bottom, etc. Then, when retrieved and transposed, the first eight bits in the first row would be the first data byte. The next three bits would be part of the next data byte. The last four bits would be parity bits.

Then, in the second row, the first five bits would form the rest of the second data byte, the next six bits would be part of the third data byte, and the last four bits would be parity bits.

This arrangement continues to the sixth row where the last six bits in the sixth row comprise two checksum bits followed by four parity bits. Then the 7th row has 11 checksum bits and four parity bits to complete the array or matrix of data.

This array may be preferred since more data is compacted into the recorded data words, i.e., 8 eight bit data bytes as opposed to 7, and a cyclic redundancy checksum byte of 13 bits is provided. The total cyclic redundancy checksum byte derived is 16 bits and for this embodiment the 13 least significant bits are retained and the rest discarded. Then, of course, for the 11 bits in row 7, a four bit parity field is developed to provide the seventh quasi-data word.

Summarizing the above, the data is encoded with multiplexing of each Hamming type coded group having a parity bit field to which is also added a cyclic redundancy checksum byte. Next, at least one, and preferably two, redundant groups are provided in each track as well as a cyclic redundancy checksum field section. With this coding, errors can be easily detected or corrected and relatively large amounts of erroneous or missing data can be recreated.

From the foregoing description it will be apparent that the encoding methods, and the coded data on a record carrier formed thereby, of the present invention provide a number of advantages, some of which have been described above and others of which are inherent in the invention. More specifically, the coded data on the record carrier is highly tolerant of "burst errors" and enables a microprocessor to easily correct and/or detect errors and recreate missing data bits.

Also it will be apparent that modifications can be made to the encoding methods and the coded recorded data formed thereby of the present invention without departing from the teachings of the present invention. Accordingly, the scope of the invention is only to be limited as necessitated by the accompanying claims.

I claim:

1. A method for encoding digital data which is recorded in arcuate tracks without timing or synchronization data on a planar substrate to form a data record carrier with a plurality of arcuate tracks thereon, each track being spaced from an adjacent track by a predetermined distance along a common centerline of the tracks, each track having the same radius throughout the arcuate path of said track such that each track extends in an arcuate manner across the data record carrier and is arranged in a nested manner relative to adjacent tracks along said common centerline, each track having a plurality of data cells therein and each track having a front track address section, a back track address section and groups of encoded data bits referred to as coded groups therebetween, each cell having the same cell length in the direction of each track for each bit of data stored in each cell and having the same cell width in a direction tranverse to the direction of each track, each cell for one form of logic (0 or 1) being a non-transition cell and each cell for the other form of logic (1 or 0) being a transition cell, said method of encoding providing error correction and including the steps of: providing in each coded group a plurality of coded words, each word comprising a byte of data bits and a field of parity bits for error correction.

2. The method of claim 1 wherein each data byte comprises an eight bit data byte and the parity field section includes four parity bits.

3. The method of claim 1 wherein each said coded group also includes a cyclic redundancy checksum word formed by invoking a residue add and shift technique.

4. The method of claim 3 wherein said cyclic redundancy checksum word includes an eight bit byte.

5. The method of claim 3 wherein said cyclic redundancy checksum word is comprised of the eight least significant bits of a 16 bit word.

6. The method of claim 3 wherein said cyclic redundancy checksum word is formed by exclusive ORing the eight least significant bits with the eight most significant bits of an original 16 bit cyclic redundancy checksum word to obtain the eight bit cyclic redundancy checksum word.

7. The method of claim 3 wherein said cyclic redundancy checksum word includes a thirteen bit byte.

8. The method of claim 1 wherein each said coded group comprises seven data words each comprising an eight bit data byte and a four bit parity field.

9. The method of claim 8 wherein each said coded group further includes an eighth word comprising an eight bit cyclic redundancy checksum byte and a four bit parity field.

10. The method of claim 1 wherein each said coded group includes a field of 96 bits of data.

11. The method of claim 1 wherein each said coded group includes a field of 105 bits of data.

12. The method of claim 1 wherein each said coded group includes seven fifteen-bit quasi-data words.

13. The method of claim 12 wherein each fifteen-bit quasi-word includes a four bit parity field.

14. The method of claim 12 wherein said first eleven bits of the seven quasi-data words or 77 bits include eight eight-bit data bytes and a thirteen bit cyclic redundancy checksum byte comprised of the 13 least significant bits of a cyclic redundancy checksum word.

15. The method of claim 1 wherein said data bits in each coded group are multiplexed.

16. The method of claim 15 wherein said multiplexing is achieved by recording the data bits in a stream which defines columns of data bits which are arrangeable in an array or matrix to form data words in rows across the array or matrix of the adjacent columns of data bits retrieved from the data record carrier in the field of the array.

17. The method of claim 1 wherein each track has from three to twenty-one coded groups therein.

18. The method of claim 1 wherein each track is provided with at least one cyclic redundancy checksum field section obtain by applying a residue add and shift technique to all the data bits in the coded groups using a CCITT polynomial, the result of which is a cyclic redundancy checksum word, such as a 16-bit cyclic redundancy checksum word, whereby the residue add and shift technique can be applied to the data retrieved from the coded groups and compared with the cyclic redundancy checksum word to detect errors.

19. The method of claim 1 wherein said cyclic redundancy checksum field section is situated between the last coded group on the track and the back track address section.

20. The method of claim 1 wherein each track is provided with at least one redundant coded group which is the result of sequential exclusive ORing, residue add, or comparing, of all the data bits in the coded groups such that if a coded group is found to be missing, the exclusive ORing of the groups retrieved and the redundant group will result in the missing group.

21. The method of claim 20 wherein two redundant coded groups are provided in each track, one such redundant group being positioned on the track at the beginning of the coded groups and being a resultant redundant group of all the odd or even coded groups, and the second such redundant group being positioned in the track at the end of the coded groups and being a resultant redundant group of all the even or odd coded groups whereby two lost adjacent groups can be recreated.

22. The method of claim 1 wherein each track address has half the data bits of the bit positions in a front track address section and the address is placed on the track in proper order in the first half of the bit positions and the second half of the bit positions of the address section are filled with the inversion or compliment of the track address in reverse order.

23. The method of claim 22 wherein each track address comprises eight data bits.

24. The method of claim 22 wherein said back track address section is a mirror image of the front track address section.

25. The method of claim 1 wherein two identical cyclic redundancy checksum field sections are provided, one at the beginning of each track and one at the end of each track and each such cyclic redundancy checksum field section is combined with a track address and placed in the front track address section or the back track address section respectively.

26. The method of claim 25 wherein said combined track address byte and cyclic redundancy checksum field byte are each encoded with a parity field, a cyclic redundancy checksum word is formed therefrom to form another data byte and all the resulting data bits are multiplexed.

27. A data record carrier made by the method of claim 1.

28. A data record carrier made by the method of claim 2.

29. A data record carrier made by the method of claim 4.

30. A data record carrier made by the method of claim 5.

31. A data record carrier made by the method of claim 6.

32. A data record carrier made by the method of claim 7.

33. A data record carrier made by the method of claim 9.

34. A data record carrier made by the method of claim 10.

35. A data record carrier made by the method of claim 11.

36. A data record carrier made by the method of claim 13.

37. A data record carrier made by the method of claim 14.

38. A data record carrier made by the method of claim 15.

39. A data record carrier made by the method of claim 16.

40. A data record carrier made by the method of claim 18.

41. A data record carrier made by the method of claim 20.

42. A data record carrier made by the method of claim 21.

43. A data record carrier made by the method of claim 22.

44. A data record carrier made by the method of claim 24.

45. A data record carrier made by the method of claim 26.

46. A method for encoding digital data which is recorded in arcuate tracks without timing or synchronization data on a planar substrate to form a data record carrier with a plurality of arcuate tracks thereon, each track being spaced from an adjacent track by a predetermined distance along a common centerline of the tracks, each track having the same radius throughout the arcuate path of said track such that each track extends in an arcuate manner across the data carrier and is arranged in a nested manner relative to adjacent tracks along said common centerline, each track having a plurality of data cells therein and each track having a front track address section, a back track section and groups of encoded data bits referred to as coded groups therebetween, each cell having the same cell length in the direction of each track for each bit of data stored in each cell and having the same cell width in a direction transverse to the direction of each track, each cell for one form of logic (0 or 1) being a non-transition cell and each cell for the other form of logic (1 or 0) being a transition cell, said method of encoding providing error detection and/or correction of a track address in the front track address section and/or the back track address section and including the steps of: providing, in at least one of the front or back track address sections, bit positions twice the number of bit positions in the track address, placing the track address bits in the proper order in the first half of the bit positions in that track address section and placing an inversion or compliment of the address in reverse order in the remaining bit positions in that track address section.

47. A data record carrier having digital data encoded in a plurality of arcuate tracks without timing or synchronization data on a planar substrate, each track being spaced from an adjacent track by a predetermined distance along a common centerline of the tracks, each track having the same radius throughout the arcuate path of said track such that each track extends in an arcuate manner across the data record carrier and is arranged in a nested manner relative to the adjacent tracks along said common centerline, each track having a plurality of data cells therein and each track having a front track address section, a back track address section and groups of encoded data bits referred to as coded groups therebetween, each cell having the same cell length in the direction of each track for each bit of data stored in each cell and having the same cell width in a direction transverse to the direction of each track, each cell for one form of logic (0 or 1) being a non-transition cell and each cell for the other form of logic (1 or 0) being a transition cell and each coded group having error correction coded therein such that each coded group comprises a plurality of coded words and each word comprises a byte of data bits and a field of parity bits for error correction.

48. The data record carrier of claim 47 wherein each data byte comprises an eight bit data byte and the parity field section includes four parity bits.

49. The data record carrier of claim 47 wherein each said coded group also includes a cyclic redundancy checksum word formed by invoking a residue add and shift technique.

50. The data record carrier of claim 49 wherein said cyclic redundancy checksum word includes an eight bit byte.

51. The data record carrier of claim 49 wherein said cyclic redundancy checksum word is comprised of the eight least significant bits of a 16 bit word.

52. The data record carrier of claim 49 wherein said cyclic redundancy checksum word is formed by exclusive ORing the eight least significant bits with the eight most significant bits of an original 16 bit cyclic redundancy checksum word to obtain the eight bit cyclic redundancy checksum byte.

53. The data record carrier of claim 49 wherein said cyclic redundancy checksum word includes a thirteen bit byte.

54. The data record carrier of claim 49 wherein each said coded group comprises seven data words each comprising an eight bit data byte and a four bit parity field.

55. The data record carrier of claim 54 wherein said coded group further includes an eighth word comprising an eight bit cyclic redundancy checksum byte and a four bit parity field.

56. The data record carrier of claim 47 wherein each said coded group includes a field of 96 bits of data.

57. The data record carrier of claim 47 wherein each said coded group includes a field of 105 bits of data.

58. The data record carrier of claim 47 wherein each said coded group includes seven fifteen-bit quasi-data words.

59. The data record carrier of claim 58 wherein each fifteen-bit quasi-data word includes a four bit parity field.

60. The data record carrier of claim 58 wherein said first eleven bits of the seven quasi-data words or 77 bits include eight eight-bit data bytes and a thirteen bit cyclic redundancy checksum byte comprised of the 13 least significant bits of a cyclic redundancy checksum word.

61. The data record carrier of claim 47 wherein said data bits in each coded group are multiplexed.

62. The data record carrier of claim 61 wherein said multiplexing is achieved by recording the data bits in streams which define columns of data bits which are arrangeable in an array or matrix of the adjacent columns of data bits retrieved from the data record carrier in the field of the array.

63. The data record carrier of claim 47 wherein each track has from three to twenty-one coded groups therein.

64. The data record carrier of claim 47 wherein each track is provided with at least one cyclic redundancy checksum field section obtained by invoking a CCITT polynomial for all the data bits in the coded groups which invoking consists of an application of a residue add and shift technique to all the data bits, the result of which is a cyclic redundancy checksum word, such as a 16-bit cyclic redundancy checksum word, whereby the residue add and shift technique can be applied to the data retrieved from the coded groups and compared with the checksum word to detect errors.

65. The data record carrier of claim 47 wherein said cyclic redundancy checksum field section is situated between the last coded group on the track and the back track address section.

66. The data record carrier of claim 47 wherein each track is provided with at least one redundant coded group which is the result of sequential exclusive ORing, residue add, or comparing, of all the data bits in the coded groups such that if a coded group is found to be missing, the exclusive ORing of the groups retrieved and the redundant group will result in the missing group.

67. The data record carrier of claim 66 wherein two redundant coded groups are provided in each track, one such redundant group being positioned on the track at the beginning of the coded groups and being a resultant redundant group of all the odd or even coded groups, and the second such redundant group being positioned in the track at the end of the coded groups and being a resultant redundant group of all the even or odd coded groups whereby two lost adjacent groups can be recreated.

68. The data record carrier of claim 47 wherein each track address has half the data bits of the bit positions in a track address section and the address is placed on the track in proper order in the first half of the bit positions and the second half of the bit positions are filled with the inversion or compliment of the track address in reverse order.

69. The data record carrier of claim 68 wherein each track address comprises eight data bits.

70. The data record carrier of claim 68 wherein said back track address section is a mirror image of the front track address section.

71. The data record carrier of claim 47 wherein two identical cyclic redundancy checksum field sections are provided, one at the beginning of each track and one at the end of each track and each such cyclic redundancy checksum field section is combined with a track address and placed in the front track address section or the back track address section respectively.

72. The data record carrier of claim 71 wherein said combined track address byte and cyclic redundancy checksum field byte are each encoded with a parity field, a cyclic redundancy checksum word is formed therefrom to form another data byte and all the resulting data bits are multiplexed.

73. A data record carrier having digital data encoded in a plurality of arcuate tracks without timing or synchronization data on a planar substrate, each track being spaced from an adjacent track by a predetermined distance along a common centerline of the tracks, each track having the same radius throughout the arcuate path of said track such that each track extends in an arcuate manner across the data record carrier and is arranged in a nested manner relative to adjacent tracks along said common centerline, each track having a plurality of data cells therein and each track having a front track address section, a back track address section and groups of encoded data bits referred to as coded groups therebetween, each cell having the same cell length in the direction of each track for each bit of data stored in each cell and having the same cell width in a direction transverse to the direction of each track, each cell for one form of logic (0 or 1) being a non-transition cell and each cell for the other form of logic (1 or 0)

being a transition cell a track address being encoded in said front or back address section by having in at least one of the front or back track address sections, bit positions equal to twice the number of bit positions in the track address, with the track address bits placed in proper order in the first half of the bit positions in said front or back track address section and with an inversion or compliment of the track address bits placed in reverse order in the remaining bit positions in said front and back address section.

* * * * *